(No Model.)

R. R. DUMM.
GRAVE MOUND OR FLOWER BED IRRIGATOR.

No. 524,433. Patented Aug. 14, 1894.

Witnesses:
J. M. Fowler Jr.
Thomas Durant.

Inventor:
Robert R. Dumm,
By Church & Church
his Attorneys.

UNITED STATES PATENT OFFICE.

ROBERT R. DUMM, OF UPPER SANDUSKY, OHIO.

GRAVE-MOUND OR FLOWER-BED IRRIGATOR.

SPECIFICATION forming part of Letters Patent No. 524,433, dated August 14, 1894.

Application filed January 30, 1894. Serial No. 498,467. (No model.)

*To all whom it may concern:*

Be it known that I, ROBERT R. DUMM, of Upper Sandusky, in the county of Wyandot, State of Ohio, have invented certain new and useful Improvements in Grave-Mound and Flower-Bed Irrigators; and I do hereby declare the following to be a full, clear, and exact description of the same, reference being had to the accompanying drawings, forming a part of this specification, and to the letters of reference marked thereon.

This invention has for its object to provide a means for promoting the growth of vegetation on grave mounds by supplying a proper quantity of moisture thereto, and at the same time requiring but little attention and a small supply of water, the water being prevented from escaping into the surrounding soil, thus adapting the structure for use more especially in dry climates, or in climates where irrigation is essential for a luxuriant plant growth.

The invention consists in certain novel details of construction and combinations and arrangements of parts, all as will be now described and pointed out particularly in the appended claims.

Figure 1:
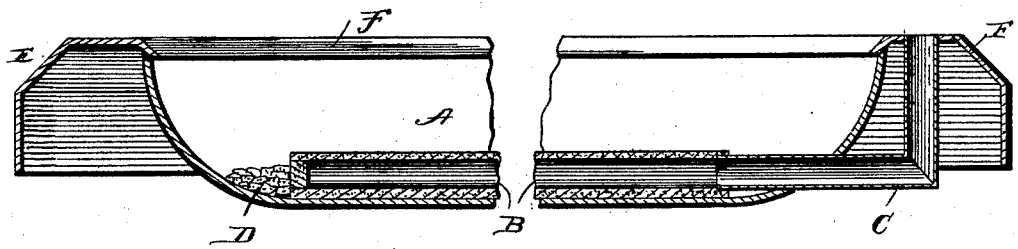
Figure 2:
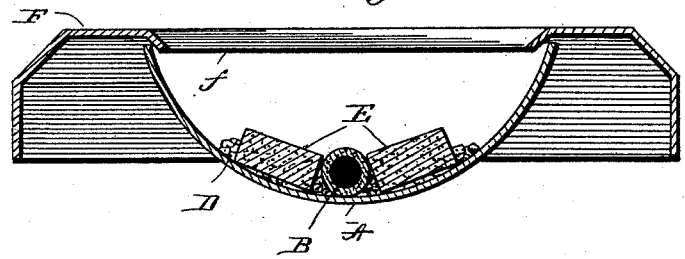
Figure 3:
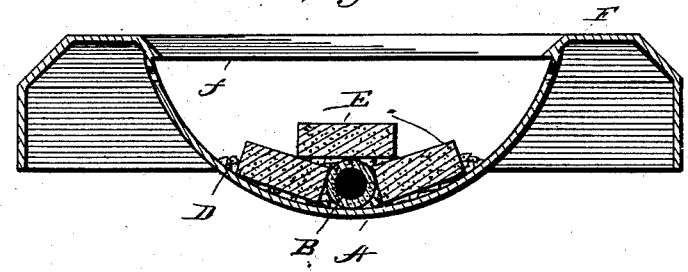

Referring to the accompanying drawings: Figure 1 is a longitudinal section through a structure embodying my present invention. Fig. 2 is a transverse section through the same. Fig. 3 is a similar view showing a slightly different arrangement of the parts.

Like letters of reference indicate the same parts in all the figures.

The inclosing portion of the structure I preferably make of iron or other suitable metal and in the preferred form it consists of a long rectangular and deep pan or vessel, lettered A in the drawings. This pan is of approximately the size of the mound of earth or more properly of the base of the mound and in the bottom of the pan or receptacle there is located a longitudinal hollow and preferably porous walled tile or tiling B, with porous tiles or brick E on each side of it. Water is supplied to the hollow tile through a supply pipe C and is absorbed by the porous brick at each side, being thereby distributed evenly over the bottom of the whole pan where the roots of the plants planted in earth held in the pan can readily reach it, and at the same time an excessive supply of moisture is prevented thus maintaining the porosity of the earth, which is just as essential to plant life as a proper supply of moisture.

To further increase the dissemination of the water the tiles and brick are packed around with an absorbent substance indicated by the letter D which may be charcoal or any other suitable substance.

The porous brick may in addition to being located at each side of the hollow tile, be also located over and bridging the same as indicated in Fig. 3, thus protecting the surface of the hollow tile and maintaining its porosity unimpaired, this being especially desirable where there are no perforations or openings formed in the hollow tile and the only escape for the water is through the pores.

To protect the edge of the pan and give the mound a proper ornamental appearance, a coping F is placed around the same. This coping is preferably made integral with the pan and having an edge or flange $f$ projecting inside of the same, suitable apertures being left at the top edge of the pan for the escape of water, should the pan be flooded. These apertures are left in every instance, whether the coping and pan be formed integral as in Fig. 3, or separate and then united as in Fig. 2, either by cutting away the edges of the pan at suitable points or forming openings therein.

The supply pipe usually has its opening at the top of the coping in position to be conveniently supplied from a watering cart, vessel or hose as the case may be.

In preparing the grave the bottom of the pan is intended to be buried and earth filled into the pan to form a proper mound, in which the plants or grass may be planted. The outer edge of the coping rests on the ground, or if it is desired to have a low coping it may be partially buried as will be readily understood.

While the invention has been described as intended for the irrigation of grave mounds, it is equally well adapted to irrigate flower beds and small vegetable gardens and where necessary the pan and contained tiles, or the tiles alone, may be duplicated to irrigate the larger area, without departing from the spirit of the invention.

Having thus described my invention, what I claim as new is—

1. In a grave mound irrigator, the combination with the pan, of the coping provided with a flange projecting inside of the pan, the porous tiling in the bottom of the pan and a water supply for supplying moisture to said tiling, substantially as described.

2. In a grave mound irrigator, the combination with the coping and pan underlying said coping with the overflow openings therein, of the hollow porous tiling in the bottom of the pan and a water supply communicating with said tiling and opening out at the top of the coping; substantially as described.

ROBERT R. DUMM.

Witnesses:
F. E. DUMM,
JOEL W. GIBSON.